2,793,228

OZONOLYSIS OF FURFURAL

Frank P. Florentine, Jr., Stockbridge, Mass., assignor to General Electric Company, a corporation of New York No Drawing. Application March 27, 1953, Serial No. 345,248

6 Claims. (Cl. 260—434)

This invention relates to a process of producing valuable organic compounds from substituted or unsubstituted heterocyclic aldehydes, for example, furfural. The invention is concerned more particularly with a process of producing oxidation reaction products of furfural or a substituted furfural in which process the oxidation is primarily by means of ozone.

In the past, it has generally been known that furfural is very subject to oxidation and polymerization by the action of oxygen and the mere exposure to air gives rise to inseparable mixtures of dark colored and tarry products. Because of this tendency toward products having little, if any, utility, no successful method of oxidizing furfural heretofore has been known.

It has now been unexpectedly discovered that useful and readily recoverable furfural oxidation products can be produced by oxidizing with ozone in either oxygen or air. This is surprising and completely unexpected since ozone is a much more powerful oxidant than oxygen or air and it should normally be expected that the attack of ozone on a furfural compound would be very violent and uncontrollable, resulting in oxidized and polymerized materials in a complex mixture difficult to separate and identify. To the contrary, it has been found that if a stream of ozonized oxygen or ozonized air is passed through a solution of furfural, in a solvent capable of dissolving furfural, reaction proceeds smoothly until one mol of $O_3$ has been absorbed per mol of furfural charged to give an end product which is water white as compared to stored furfural which is usually brown due to oxidation merely by exposure to air. The reaction with ozone does not appear to be merely the simple one of adding $O_3$ to the C=C bond as is the case in ordinary olefinic compounds, since no ozonide is isolated and no ozonide cleavage step is necessary to obtain stable oxidation products.

The furfural compounds used in carrying the invention into effect may be broadly stated, furfural per se or any substituted furfural in which the substituent is a functional group substituted for hydrogen on a carbon atom of the furan nucleus. Illustrative examples of such compounds other than furfural include 5-hydroxymethylfurfuraldehyde, alkylated furfurals such as the methyl, ethyl, propyl, etc., and polyalkyl derivatives, halogenated furfurals, hydroxy, carboxy and carbalkoxy substituted furfurfals and others.

The oxidizing gases which I employ in my process include mixtures of ozone in oxygen and ozone in air, the concentration of which is determined by reacting a measured volume of the particular mixture with neutral aqueous potassium iodide, acidifying and titrating with a standard thiosulfate solution.

In carrying this reaction into effect, any solvent, not too readily attacked by ozone and capable of dissolving furfural, can be employed as a reaction medium. Methanol or any other low molecular weight alcohol is preferred since acid products which appear as esters and aldehydic or ketonic functions which appear partly as acetals or hemiacetals are more stable than free aldehyde, ketone and acid products and can be distilled at reduced pressure without decomposition. Illustrative examples of other solvents in which the attack by ozone proceeds include water, hydrocarbons, chlorinated hydrocarbons, organic acids, esters and ketones.

The oxidation proceeds under a wide variety of temperature and pressure conditions. Any temperature below the decomposition temperatures of ozone or of the products may be used, a specific range being from —80° C. to +50° C. With respect to pressures, subatmospheric, atmospheric or superatmospheric pressures can be used. A specific operable range is any pressure within the range of 0.1 to 10 atmospheres absolute.

Various operating techniques can be employed. For instance, the reactants can be brought together countercurrently in a suitable reactor. Alternatively, the reactants can be run into a reactor as separate streams or the reactants can be mixed exclusively of the reactor and fed to the reactor as a single stream. In another method, the reaction gas can be added to a quantity of a furfural by bubbling the gas through the furfural compound or a solution thereof. In practice, a continuous countercurrent method in which an upward flow of gas reacts with a downward flow of a furfural compound or a solution thereof in a reactor adaptable to countercurrent operation is preferred.

In order that those skilled in the art better may understand how this invention may be carried into effect, the following examples are given by way of illustration, and not by way of limitation. All parts are by weight.

*Example 1*

A stream of ozone of 1.5 mol percent concentration (in oxygen) was passed into 109 parts of furfural as a 10 percent solution in methanol until no longer absorbed. The solvent was evaporated at reduced pressure and the following materials successively fractionally distilled from the residue:

1. A new compound identified as the methyl alcoholate of methyl glyoxylate, having the formula

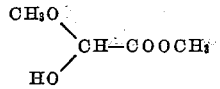

B. P. 47–48° C. at 13 mm. This compound was recovered to the extent of 30 percent, by weight, of the furfural charged.

2. A material which boiled at 163° C. having the probable formula $C_5H_{10}O_6$ or $C_6H_{12}O_7$, formed to the extent of 30 percent, by weight, of furfural; it gave a negative aldehydic test and saponified to an acidic material.

3. A fraction identified as dimethyl diketosuccinate, B. P. 57° C. at 11 mm., formed to the extent of 10 percent, by weight, of furfural.

4. A fraction boiling at 30–40° C. at 1 mm. formed to the extent of approximately 10 percent, by weight, of furfural.

5. A mixture of compounds which gave a positive aldehyde test and boiled at 110–125° C., to the extent of approximately 20 percent, by weight, of furfural.

6. Less than 1.0 percent, by weight, of furfural of solid residue, probably polymeric in nature.

*Example 2*

Into 21.6 parts of furfural in a mixture of water and cyclohexane was passed a stream of ozone of 1.5 mol percent concentration (in oxygen) until ozone was no longer absorbed. The water layer was separated and by exhaustive ether extraction, formic acid was identified and recovered to the extent of 0.6 mol per mole of furfural charged.

In each of the above examples, the ozone stream was passed through the solution and reaction proceeded smoothly until one mol of $O_3$ had been absorbed per mol of furfural charged resulting in a water white product. As previously indicated, methanol or any one of the low molecular weight alcohols including primary and secondary alcohols is preferred as a solvent since the alcoholate and/or ester products are more conveniently manipulated than the free aldehydic, ketonic and acidic products produced when water is the solvent.

When using water as solvent, the isolation of a better part of a mol of formic acid indicates that the attack by the ozone on furfural must have been primarily at the unsaturated carbon-to-carbon bond not conjugated with the —CHO group,

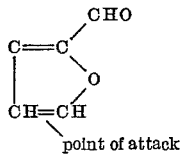

When an alcohol, for example, is used as a solvent, subsequent hydrolysis, alcoholysis and oxidation of the products of this cleavage are believed to give rise to the products found in Example 1.

The products of my process are useful intermediates in organic syntheses. In particular, the methyl alcoholate-methyl ester of glyoxylic acid, which is a new compound, can be used as a reservoir of glyoxylic acid, it being more stable than glyoxylic acid. For example, using an acid catalyst, many nitrogen-containing heterocyclic compounds can be prepared as, for instance, quinoxalinol, by reaction with orthophenylene diamine. Additionally, condensation through the —CHO group yields polymeric carboxy acids. For example, phenol reacted with glyoxylic acid liberated in acidic solution from the methyl alcoholate-methyl ester can give polymers such as

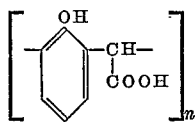

A further use, with the aid of acid catalysts, lies in condensation of the —CHO group with ammonia or amines, followed by hydrogenation to yield amino acids.

What I claim as new and desire to secure by Letters Patent of the United States is:

1. The method of preparing oxygenated organic derivatives of furfural which comprises reacting, at a temperature below 50° C., liquid furfural with a gaseous mixture selected from the group consisting of (a) ozonized oxygen and (b) ozonized air and recovering oxygenated organic compounds produced thereby.

2. The method of preparing formic acid which comprises reacting at a temperature below 50° C., aqueous furfural with a gaseous mixture selected from the group consisting of (a) ozonized oxygen and (b) ozonized air, the furfural and ozone being in equimolecular proportions, until ozone absorption is complete and recovering formic acid.

3. The method of preparing formic acid which comprises reacting, at a temperature below 50° C., liquid furfural dissolved in aqueous cyclohexane with a mixture of ozonized oxygen, the furfural and ozone being in equimolecular proportions, until ozone absorption is complete and recovering formic acid.

4. The method of preparing oxygenated organic compounds which comprises reacting, at a temperature below 50° C., liquid furfural dissolved in a low molecular weight alcohol with a gaseous mixture of ozonized oxygen and recovering a reaction product comprising said oxygenated organic compounds.

5. The method of preparing oxygenated organic compounds which comprises reacting, at a temperature below 50° C., liquid furfural dissolved in a low molecular weight alcohol with a gaseous mixture of ozonized air and recovering a reaction product comprising oxygenated organic compounds.

6. The method of preparing the methyl alcoholate-methyl ester of glyoxylic acid having the formula

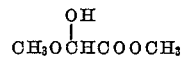

which comprises reacting, at a temperature below 50° C., a methanol solution of liquid furfural with a gaseous mixture of ozonized oxygen and recovering a reaction product comprising said methylalcoholate-methyl ester of glyoxylic acid.

References Cited in the file of this patent

UNITED STATES PATENTS 1,995,614     Jaeger _____ Mar. 26, 1935

OTHER REFERENCES

Freri; Gazz. Chim. Ital. 63, 281 (1933).
Beilstein, Vierte Auflage, Band III (1942) p. 389.
Dunlop et al.: "The Furans" (1953), pp. 385–399.